US012805421B2

(12) United States Patent
Dietrich et al.

(10) Patent No.: US 12,805,421 B2
(45) Date of Patent: Nov. 24, 2026

(54) INTER-ROW CULTIVATOR WITH A LARGE WORKING WIDTH

(71) Applicant: Amazonen-Werke H. Dreyer SE & Co. KG, Hasbergen (DE)

(72) Inventors: Robert Dietrich, Flößberg (DE); Tom Mahler, Leipzig (DE); Rainer Resch, Hagen a TW (DE); Tino Lenz, Leipzig (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 471 days.

(21) Appl. No.: 18/276,631

(22) PCT Filed: Feb. 1, 2022

(86) PCT No.: PCT/EP2022/052289
§ 371 (c)(1),
(2) Date: Aug. 9, 2023

(87) PCT Pub. No.: WO2022/171484
PCT Pub. Date: Aug. 18, 2022

(65) Prior Publication Data

US 2024/0114819 A1 Apr. 11, 2024

(30) Foreign Application Priority Data

Feb. 10, 2021 (DE) ........................ 102021103040.4

(51) Int. Cl.
*A01B 79/00* (2006.01)
*A01B 49/02* (2006.01)
(Continued)

(52) U.S. Cl.
CPC .......... *A01B 79/005* (2013.01); *A01B 63/002* (2013.01); *A01B 63/245* (2013.01);
(Continued)

(58) Field of Classification Search
CPC ..... A01B 73/04; A01B 73/048; A01B 63/004; A01B 63/023; A01B 69/004
See application file for complete search history.

(56) References Cited

U.S. PATENT DOCUMENTS 3,454,285 A * 7/1969 Van Peursem ....... A01B 69/003 280/412
3,960,221 A * 6/1976 Blair ...................... A01B 73/02 172/311
(Continued)

FOREIGN PATENT DOCUMENTS

DE 19640640 A1 2/1998
DE 102009044898 A1 * 6/2011 ........... A01B 63/008
(Continued)

OTHER PUBLICATIONS

German Search Report for German Patent Application No. 102021103040.4 dated Jan. 12, 2022 (includes English language translation), 11 pages.
(Continued)

*Primary Examiner* — Jamie L McGowan
*Assistant Examiner* — Audrey L Lusk
(74) *Attorney, Agent, or Firm* — Potomac Law Group, PLLC; John (Jack) J. Penny, Jr.

(57) ABSTRACT

An inter-row cultivator with a large working width, comprising a base frame with a chassis, via which the base frame is supported on the soil, and a drawbar by means of which the inter-row cultivator can be suspended on a towing vehicle; at least two tool segments, which extend transversely to the travel direction over the entire working width in a working position and which preferably extend along the travel direction in a transport position; and a plurality of hoeing assemblies which are arranged on the tool segments via a respective height guide device, preferably a remotely
(Continued)

adjustable height guide device, wherein soil working tools paired with individual plant rows are arranged on the hoeing assemblies.

20 Claims, 6 Drawing Sheets

(51) Int. Cl.

| | |
|---|---|
| ***A01B 63/00*** | (2006.01) |
| ***A01B 63/24*** | (2006.01) |
| ***A01B 63/32*** | (2006.01) |
| ***A01B 69/00*** | (2006.01) |
| ***A01B 73/04*** | (2006.01) |
| ***A01B 73/06*** | (2006.01) |

(52) U.S. Cl.
CPC ............ *A01B 63/32* (2013.01); *A01B 69/004* (2013.01); *A01B 73/048* (2013.01); *A01B 73/065* (2013.01); *A01B 49/02* (2013.01)

(56) References Cited

U.S. PATENT DOCUMENTS

| | | | | |
|---|---|---|---|---|
| 7,559,569 | B2 * | 7/2009 | Nejsum .................. | B62D 13/04 280/468 |
| 10,779,463 | B2 | 9/2020 | Sivinski | |
| 2006/0282205 | A1 * | 12/2006 | Lange .................... | G01C 21/20 701/50 |
| 2013/0186657 | A1 * | 7/2013 | Kormann ............. | A01B 69/004 172/278 |
| 2015/0127230 | A1 * | 5/2015 | Blunier ................ | A01B 63/008 701/50 |
| 2016/0324064 | A1 * | 11/2016 | Gray ......................... | G07F 7/06 |
| 2017/0118901 | A1 * | 5/2017 | Stark ...................... | A01B 76/00 |
| 2018/0325021 | A1 * | 11/2018 | Connell ............... | A01B 73/044 |

FOREIGN PATENT DOCUMENTS

| | | | |
|---|---|---|---|
| EP | 2922383 | B1 | 1/2017 |
| EP | 3884747 | A2 | 9/2021 |

OTHER PUBLICATIONS

International Search Report for International Application No. PCT/EP2022/052289 dated May 20, 2022 (includes English language translation), 7 pages.

* cited by examiner

INTER-ROW CULTIVATOR WITH A LARGE WORKING WIDTH

TECHNICAL FIELD

The disclosure relates to an inter-row cultivator with a large working width and to a towing set including a towing vehicle and such an inter-row cultivator.

BACKGROUND

Such an inter-row cultivator is disclosed in EP 2 922 383 B1. This inter-row cultivator has a base frame supported on the soil by a chassis and has a drawbar at its front end by means of which the inter-row cultivator is attachable to a towing vehicle. The inter-row cultivator further includes at least two tool segments which, in the working position, extend transversely to the travel direction over the entire working width and may be folded in longitudinally to the travel direction in order to assume the transport position. A plurality of hoeing assemblies is arranged on the tool segments. Each of the hoeing assemblies is mounted on the tool segment via a remotely adjustable height guide device and carries soil working tools assigned to individual plant rows.

The inter-row cultivator is intended for the maintenance of crops growing in plant rows. The soil working tools provided on the hoeing assemblies are to be guided between the plant rows in order to remove weeds growing there. The seeders establishing the plant rows often operate with a smaller working width compared to inter-row cultivators of large working width. Particularly in hilly, cropped terrain or due to imprecise connecting travel, this often results in an offset between the adjacent plant rows of individual working widths, which does not correspond to the distance between the individual plant rows within the working width. This results in a problem for the guidance of the soil working tools of inter-row cultivators, since its working width extends over two or more tracks of the seeder, so that the offset from the imprecise placement of the seed lies within the working width of the inter-row cultivator.

In order to enable the guidance of the hoeing assemblies between the plant rows, it has been common practice up to now to combine the tool segments of inter-row cultivators with a large working width into a rigid unit. The hoeing assemblies therefore have their preset distance from each other at the tool segment, which corresponds approximately to the distance between the plant rows. However, the offset that occurs between the adjacent plant rows of individual working widths of a seeder may not be compensated in this way, which means that the soil working tools may not be reliably guided over the entire width of the inter-row cultivator between the plant rows. Consequently, the soil working tools work in the area where crop plants grow and thus damage or destroy them.

SUMMARY

It is, therefore, the object of the disclosure to improve the cultivation of crops, especially in cropped terrain, with an inter-row cultivator with a large working width.

According to the disclosure, this object is addressed by an inter-row cultivator having some of the features described herein.

The inter-row cultivator includes a base frame with a chassis by means of which it is supported on the soil. The inter-row cultivator is thus configured as a towed implement and may be towed by means of the chassis both in the working position and in the transport position via a drawbar by means of a towing vehicle. The drawbar is located at the front end of the base frame. The inter-row cultivator includes at least two tool segments which, in a working position, extend transversely to the travel direction over substantially the entire working width. The tool segments may preferably be moved from the working position into a transport position in which they extend longitudinally to the travel direction. A plurality of hoeing assemblies is arranged on the tool segments. The hoeing assemblies carry soil working tools assigned to individual plant rows and are each arranged on a tool segment via a height guide device. The height guide devices are preferably remotely adjustable so that the height of the soil working tools is adjustable and, in particular, the devices may be lifted into a position away from the ground.

In order to be able to compensate for the offset between adjacent plant rows of individual seeder working widths, the tool segments are arranged separately displaceable on the base frame by means of a respective moving unit at least in the working position transversely to the travel direction in a controllable and/or regulatable manner, wherein at least one control unit and/or regulating unit is provided in order to determine suitable positions of the tool segments and to adjust them by means of the moving units. Due to the resolved controllability of the tool segments, these may be displaced relative to one another on the base frame, wherein the distance between the adjacent hoeing assemblies of the at least two tool segments may be adjusted by means of the control and/or regulating unit. This is particularly advantageous if the working width of a tool segment corresponds to the working width of the seeder used for sowing. The hoeing assemblies arranged on the tool segments and the soil working tools attached thereto may thus be guided particularly reliably between the plant rows to be cultivated. Each of the moving units may have at least one actuator, preferably a hydraulic synchronous cylinder, by means of which the respective tool segment may be moved, preferably via a parallelogram guide and/or linear guide. The control and/or regulating unit may include detection means, which are set up to detect an offset, in particular an angular offset with respect to a horizontal line, an offset between the tool segments and/or a distance between plant rows, and/or detect damaged growth or plant rows. Preferably, such detection means are associated with each tool segment. The detection means may be configured as a camera. Preferably, the detection means are arranged transversely to the travel direction in the central region of a tool segment. In the working position, the hoeing assemblies extend backwards from the tool segment in the travel direction.

The control and/or regulating unit is preferably set up to remotely adjust the height guide devices of the hoeing assemblies, wherein the control and/or regulating unit may include storage means for GPS-based data, so that the adjustment of the height guide devices takes place, in particular automatically, on the basis of the GPS data. With the aid of the height guidance devices, in particular in wedge-shaped field sections or at the headland, the hoeing assemblies may thus be raised individually so that the soil working tools are carried over areas that do not require to be worked on.

The tool segments are preferably arranged on the base frame by means of the moving units so as to allow following the relief of the field to be maintained independently of each other. For this purpose, suitable swivel joints may be provided at the transition between the tool segment and/or the moving unit to the base frame.

The base frame may include two foldable extensions, each of which being assigned a tool segment with the moving unit being arranged between the respective extension and the tool segment.

In an advantageous further embodiment of the inter-row cultivator, the chassis includes at least one steering axle, with the control and/or regulating unit being set up to steer the chassis. By means of the control and/or regulating unit, a steering angle may be preset for the steering axle. An actuator may be provided to swivel the steering axle by a predetermined steering angle. The control and/or regulating unit may include storage means that are set up to store GPS data of a sowing operation of a seeder in a retrievable manner, so that the control and/or regulating unit is able to steer the chassis along the GPS track of a seeder. The control and/or regulating unit may have sensors for detecting the speed of the wheel axle of the towing vehicle and/or of the chassis, the steering angle of the towing vehicle and/or of the chassis of the inter-row cultivator and/or the position, in particular the GPS signal, of the towing vehicle or be connected to such sensors of the towing vehicle in a data-exchanging manner, so that the control and/or regulating unit may steer the chassis on the basis of the data of these sensors.

A further advantageous embodiment of the inter-row cultivator is characterized by at least one coulter disc, which is arranged on the base frame, in particular on an extension arm of the base frame, so as to be rotatable in an adjustable manner about an at least approximately upright axis with the control and/or regulating unit being set up to adjust an angle of attack of the coulter disc. In the working position, the six-disc is in contact with the soil and may thus transmit forces, in particular transverse to the travel direction, between the soil and the base frame. Preferably, at least one coulter disc is mounted on both lateral extensions so that the displacement force from the moving units, by means of which the tool segments are arranged on the base frame, is transmitted directly to the soil and has a minimal effect on the chassis. Particularly preferably, several coulter disc units are mounted on the two lateral extensions. The coulter disc may be rotated in an adjustable manner by means of an actuator. The coulter disc may have an angle of attack of 0 degrees when oriented in the travel direction. The angle of attack may be set positively and/or negatively so that the coulter disc generates a lateral force transverse to the travel direction to the right or left and transmits it to the base frame. Preferably, the control and/or regulating unit sets the angle of attack in such a way that a lateral force generated in this way counteracts a current displacement force.

The inter-row cultivator according to the disclosure is further advantageously embodied in that the control and/or regulating unit includes detection means for determining the relative position between the inter-row cultivator and a towing vehicle, in that the control and/or regulating unit is set up to steer the chassis such that it follows the track of a towing vehicle. The detection means may include a gyroscope. The detection means may enable angular sensing between the drawbar and the towing vehicle. This further embodiment is particularly advantageous in turning operations where, as a result of this measure, crops are spared from the chassis of the inter-row cultivator.

In a further advantageous embodiment of the inter-row cultivator, the control and/or regulating unit includes detection means for determining an inclination of the inter-row cultivator, preferably of the at least two tool segments with the control and/or regulating unit being set up to steer the chassis and/or to set an adapted angle of attack of the coulter disc on the basis of the detected inclination. The detection means may include a gyroscope. Alternatively or additionally, it is conceivable that the relief of the field to be maintained is known to the control and/or regulating unit, so that the expected inclination of the inter-row cultivator may be determined and the control and/or regulating unit steers the chassis and/or sets a suitable angle of attack of the coulter discs on the basis of the determined expected inclination. As a result of this further embodiment, the control and/or regulating unit is set up to compensate for the downward slope force acting on the inter-row cultivator and/or the towing vehicle and/or the resulting slope drift when driving on slopes by steering the chassis uphill and/or setting the angle of attack of the at least one coulter disc in such a way that the resulting lateral force counteracts the slope drift. The hoeing assemblies may thus be guided particularly reliably between the plant rows even under difficult conditions.

The inter-row cultivator according to the disclosure is further advantageously configured in that the control and/or regulating unit has sensors for detecting lateral forces arising from the actuation of the moving units, with the control and/or regulating unit being set up to steer the chassis and/or to set an adapted angle of attack of the coulter disc on the basis of the detected lateral forces. Due to the working tools being in contact with the soil in the working position, lateral forces arise during the displacement of the tool segments by means of the moving units, which as a result of this measure may be at least approximately compensated with the aid of the chassis and/or the at least one coulter disc. The lateral forces resulting from the displacement, which would otherwise have a negative effect on the tracking of the inter-row cultivator, may thus be at least approximately compensated in an advantageous manner. The sensors for detecting the resulting lateral forces may be assigned to the moving units, in particular to an actuator. The sensors for detecting the lateral forces generated may alternatively or additionally be assigned to a soil working tool.

In a further advantageous embodiment of the inter-row cultivator, the control and/or regulating unit includes detection means for detecting a displacement path of the moving units, wherein the control and/or regulating unit is set up to steer the chassis and/or to set an adapted setting angle of the coulter disc on the basis of at least one detected displacement path. Only a limited displacement path is available to the moving units in order to guide the hoeing assemblies of the associated tool segment between the plant rows. From a central position, the displacement path may be at least 15 centimeters, preferably at least 20 centimeters, particularly preferably at least 25 centimeters transverse to the travel direction. As a result of this measure, for example, when the maximum displacement path is reached, a displacement of the tool segment may be brought about by the chassis and/or the at least one coulter disc, so that the hoeing assemblies are guided in a suitable manner between the plant rows and/or the displacement path is again available to at least one moving unit for guiding the hoeing assemblies between the plant rows. The detection means for detecting a displacement path may be used in particular for determining the suitable position of the tool segments and preferably for avoiding collisions between the tool segments.

In a further advantageous embodiment of the inter-row cultivator, the drawbar is configured to be variable in length, preferably telescopic, wherein the control and/or regulating unit is set up to adjust the length of the drawbar. Preferably, a maximum length of the drawbar is set for assuming the transport position of the inter-row cultivator and/or a minimum length of the drawbar is set for assuming the working position of the inter-row cultivator, in particular during cornering. A short drawbar length offers the advantage that the inter-row cultivator may be turned in a particularly space-saving manner. A long drawbar length, on the other hand, creates sufficient space along the inter-row cultivator to move the tool segments into the transport position along the travel direction.

In a further advantageous embodiment of the inter-row cultivator the control and/or regulating unit is set up to be connected to a towing vehicle in a signal-conducting manner and to transmit control signals, in particular steering signals and/or signals for controlling at least one hydraulic control unit, to the towing vehicle. As a result of this further embodiment, a track in which the inter-row cultivator is to be pulled for improved soil cultivation may be specified to the towing vehicle by the control and/or regulating unit of the inter-row cultivator. A hydraulic control unit may be a hydraulic valve for connection to a pressure source of the towing vehicle, so that hydraulic components of the inter-row cultivator are controllable by the control and/or regulating unit via the towing vehicle. A hydraulic control unit of the inter-row cultivator may thus be omitted or at least saved. Preferably, in this further embodiment, the control and/or regulating unit includes detection means according to one of the embodiments described above, in particular detection means for determining the relative position between the inter-row cultivator and a towing vehicle, detection means for determining an inclination of the inter-row cultivator, preferably of the at least two tool segments, sensors for detecting the lateral forces resulting from the actuation of the moving units and/or detection means for detecting a displacement path of the moving units so as to allow determining improved control signals.

The inter-row cultivator is further advantageously configured in that the base frame includes at least one swivel device with at least one horizontal swiveling axis, wherein the moving units and/or tool segments may be swiveled about the horizontal swivelling axis by at least 10 degrees, preferably at least 30 degrees, particularly preferably at least 50 degrees. The swivel device may include at least one actuator by means of which the moving units and/or tool segments may be swiveled about the horizontal swivel axis. When the moving units are arranged on hinged extensions of the base frame, the extension may also be swiveled by at least 10 degrees, preferably at least 30 degrees, particularly preferably at least 50 degrees. Increased ground clearance may be generated by rotating the moving units and/or tool segments about the swivel axis with the aid of the swivel device. The swivel device may be configured as a link between the base frame and the moving units. Alternatively, the swivel device may be arranged between the moving unit and the tool segments. The swivel device is preferably provided for moving the inter-row cultivator between the transport position, an intermediate position and the working position. In the intermediate position, the moving units and/or tool segments are in the position swung up by at least 10 degrees, preferably at least 30 degrees, particularly preferably at least 50 degrees, with respect to the working position, so that the inter-row cultivator has an increased ground clearance. In the intermediate position, the hoeing assemblies consequently point upwards approximately by at least 10 degrees, preferably 30 degrees, particularly preferably 50 with respect to the horizontal. The intermediate position may be used for turning the inter-row cultivator on the headland, where the increased ground clearance helps to protect the crop. The control and/or regulating unit may be given a height value by a user via a suitable input device, by which the swivel device is swiveled. The height value may correspond to the size of the crops present in the field to be cultivated, insofar as the hoeing assemblies are lifted by means of the swivel device only up to above the crops and not higher. As a result of the input of a height value, the lifting force requirement and the time required for lowering the soil working tools again may be minimized in an expedient manner. Preferably, the moving units and/or tool segments may be rotated by at least approximately 90 degrees with respect to the working position by means of the swivel device, so that hoeing assemblies projecting backwards at the tool segments in the working position subsequently point at least approximately upwards. To assume the transport position, the tool segments may be folded forward by at least approximately 90 degrees about a folding axis so that they extend longitudinally to the travel direction. The swivel axis is different from the folding axis so that the tool segments may be moved from the working position to the transport position in two stages: The tool segments may first be rotated about the horizontal swivel axis by means of the swivel device and then folded forwards about the folding axis.

The inter-row cultivator is further particularly advantageously configured in that the control and/or regulating unit for turning the inter-row cultivator, in particular when the end and/or beginning of a plant row to be worked on is reached, is set up to actuate the swivel device. The control and/or regulating unit preferably actuates the swivel device such that, when the end of a plant row to be cultivated is reached, the moving units and/or tool segments are swiveled upward about the horizontal axis, in particular into the intermediate position, in order to provide sufficient ground clearance for turning. Alternatively or additionally, the control and/or regulating unit actuates the swivel device such that, when the beginning of a plant row to be cultivated is reached, the moving units and/or tool segments are swiveled downward about the horizontal axis, in particular into the working position, in order to allow the detection devices the correct viewing angle of the field to be cultivated and thus to facilitate locating the plant rows to be cultivated and the spaces between the plant rows to be worked. As a result of this measure, the control and/or regulating unit is particularly reliable and time-saving to determine the correct position for the moving units for the cultivation of the plant rows. During turning, in particular in the intermediate position, the hoeing assemblies are preferably in a position raised by means of the height guide devices. If the hoeing assemblies are then at the beginning of the plant row to be cultivated, they are lowered by means of the height guide devices as a result of the control and/or regulating unit. The control and/or regulating unit may thus implement automatic headland management, in particular by means of GPS data.

In a further advantageous embodiment of the inter-row cultivator the moving units include a parallelogram guide, wherein the control and/or regulating unit for assuming the transport position is arranged to actuate the moving units in such a way that the area enclosed by the parallelogram guide is reduced. When the area enclosed by the parallelogram guide is reduced, the parallelogram guide is retracted so that the four sides of the parallelogram guide at least approximately abut each other. In other words, the parallelogram guide is then in a position of reduced longitudinal extension and increased transverse extension. Thus, in particular in combination with the swivel device and/or the forward folding of the tool segments about the folding axis, an improved transport position is achieved representing a reduced transport height and/or transport width. That is, by reducing the area enclosed by the parallelogram guide, the components connected via the moving unit move closer together.

The inter-row cultivator according to the disclosure is further advantageously configured by a sequential circuit, in particular an electro-hydraulic one, which couples the swivel device and a folding device for moving the tool segments between the working position and the transport position. The folding device may act on the extensions of the base frame so that the tool segments coupled to it via the moving units may be folded in. By means of the sequential circuit, the following sequence of movements may be implemented for transfer from the working position to the transport position and vice versa: The tool segments may first be rotated about the horizontal swivel axis by means of the swivel device. It is conceivable that for the sequential circuit a definable amount may be specified, by which the tool segments are swiveled. The tool segments are then folded forward about a folding axis of the folding device. The tool segments thus extend longitudinally to the travel direction and the hoeing assemblies attached to them are swiveled up by means of the swivel device. To assume the working position from the transport position, the sequential circuit may operate in reverse order.

In a further advantageous embodiment of the inter-row cultivator, at least one hoeing assembly, preferably arranged centrally behind the base frame, has an adjustable cutting width. By adjustable cutting width it is to be understood that the distance between the soil working tools arranged on this hoeing assembly is adjustable. The cutting width then results from the distance between the soil working tools arranged opposite each other transversely to the travel direction.

The cutting width may be adjustable in that the soil working tools may be displaced relative to one another, preferably by means of an actuator, transversely to the travel direction, so that they are at a different distance from one another; centrally behind the base frame, i.e. in the area between the at least two tires forming the chassis, i.e. transversely to the travel direction in the central area of the working width. In this area, there is often the problem that two adjacent plant rows are at a different distance from each other, as already explained at the beginning. As a result of this further embodiment, precisely this intermediate space may be worked on in an improved manner by adapting the cutting width to the changed distance between the two plant rows.

An optimized inter-row cultivator with regard to the optimized use of available computing power is achieved in that the control and/or regulating unit is configured as a central computer, which is configured to receive signals from detection units and to further process the signals for the optimized control of actuators. In particular, the central computer receives the signals from all detection units and processes them further for the control of, preferably all, actuators. The central computer may include an optimization program that compares the control signals at least two actuators with each other and matches them to each other so as to minimize the computing power required. By bundling the acquired signals and by the centrally coordinated determination of the control signals, an increased efficiency of the computing power used and of the actuating movements of the actuators is achieved.

In a further advantageous embodiment of the Inter-row cultivator, the control and/or regulating unit includes storage means that are configured to store the GPS data of a sowing operation of a seeder in a retrievable manner with the control and/or regulating unit being configured to control the moving units, and preferably the height guidance devices, on the basis of the GPS data of the sowing operation. Particularly preferably, the control and/or regulating unit is arranged to steer the chassis and/or to adjust an angle of attack of the at least one coulter disc on the basis of the GPS data. As a result of this further variant, the hoeing assemblies may also be guided in a suitable manner if detection means for controlling the moving units, and preferably the height guidance devices, the chassis and/or the at least one coulter disc, fail or deliver unusable signals.

The object of the disclosure is also solved by a towing set including a towing vehicle and an inter-row cultivator according to at least one of the embodiments described above. With respect to the features and advantages of the inter-row cultivator, reference is made to the preceding embodiments. Further, the towing vehicle includes a three-point linkage having two lower links. According to the disclosure, a hydraulic master cylinder is arranged between the lower links and the inter-row cultivator in such a way that it is adapted to detect an angle between the inter-row cultivator and the towing vehicle, the master cylinder being directly hydraulically coupled to an actuator for steering the steering axle of the chassis and/or to an actuator for setting the angle of attack of the at least one coulter disc. This towing set is characterized by a particularly reliable and robust actuation for steering the steering axle of the chassis and/or for setting the angle of attack of the at least one coulter disc. The manipulated variable for at least one actuator is thus tapped directly hydraulically at the master cylinder and may be used without prior conversion.

Further details of the disclosure may be found in the example description and drawings.

DETAILED DESCRIPTION

Figure 1:
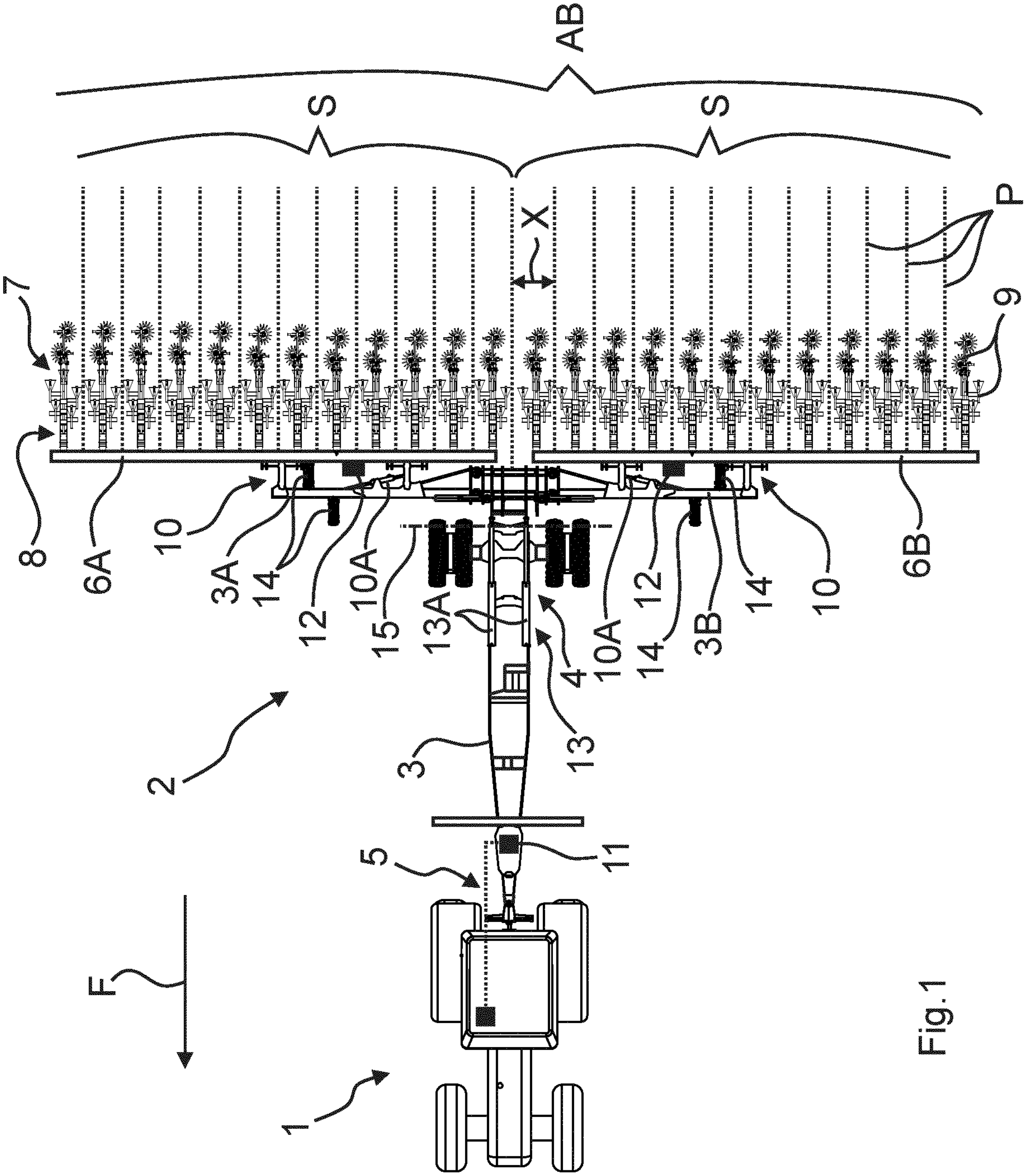
FIG. 1 shows, in plan view, a towing set consisting of a towing vehicle and an inter-row cultivator with a large working width in working position.

A towing set including a towing vehicle 1 and an inter-row cultivator 2 with a large working width is shown in FIG. 1 in plan view, with the inter-row cultivator 2 being in a working position. The inter-row cultivator 2 includes a base frame 3 with a chassis 4 via which the base frame 3 is supported on the soil. The base frame 3 also has a drawbar 5 at its front end, by means of which the inter-row cultivator 2 may be attached to the towing vehicle 1. The inter-row cultivator 2 is thus configured as towed soil cultivation implement.

Figure 2:
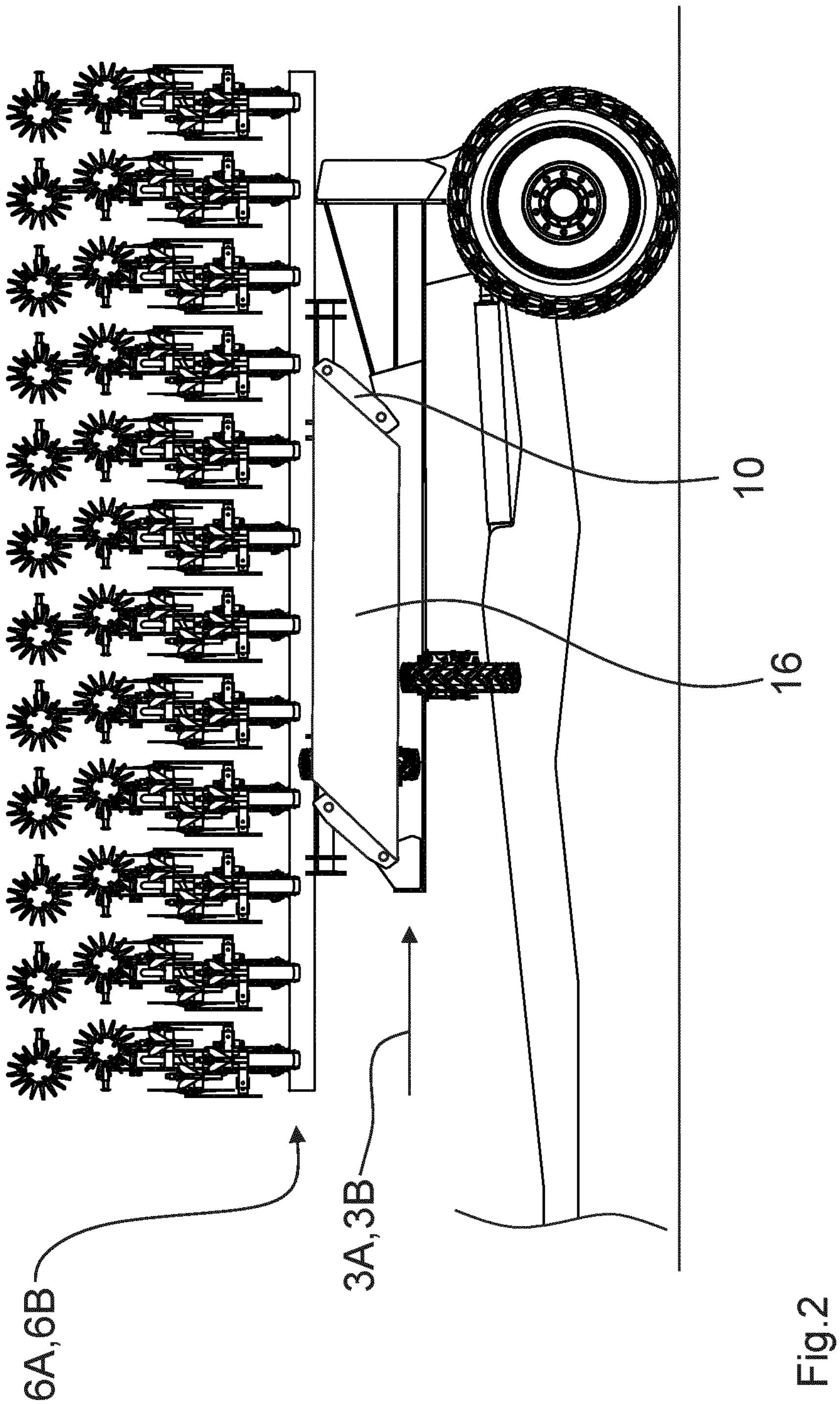
FIG. 2 shows the towing set in transport position in side view.

The inter-row cultivator 2 further includes two tool segments 6A, 6B which, in the working position shown, extend transversely to the travel direction F over substantially the entire working width AB. To assume a transport position of the inter-row cultivator 2, the tool segments 6A, 6B may be swivelled and folded in so that they extend longitudinally to the travel direction F, as shown in FIG. 2.

A plurality of hoeing assemblies 7 is arranged on the tool segments 6A, 6B, each via a remotely adjustable height guide device 8. The height guide devices are designed as parallelograms and may be adjusted remotely by means of an actuator 8A. Soil working tools 9 assigned to individual plant rows P are arranged on the hoeing assemblies 7. In the working position, the hoeing assemblies 7 extend rearward from the tool segment 6A, 6B in the travel direction F. In the transport position according to FIG. 2, the hoeing assemblies 7 extend at least approximately vertically upwards, for which a swivel device 13 is provided, as will be explained in more detail later.

Since the seeders creating the plant rows P often operate with a smaller working width S, for example half as wide as the working width AB of the inter-row cultivator 2, as shown in FIG. 1, different distances X between adjacent plant rows P of individual working widths S of a seeder may occur. These incorrect distances X may result from inaccurate connecting runs during operation of the seeder. In order to compensate for different distances X and thus to guide the hoeing assemblies 7 with the soil working tools 9 arranged thereon in a suitable manner between the plant rows P, the tool segments 6A, 6B are arranged on the base frame 3 so as to be separately displaceably at least in the working position transversely to the travel direction F by means of a moving unit 10 in each case. The tool segments 6A, 6B are arranged separately displaceably on the base frame 3. The inter-row cultivator 2 includes a control and/or regulating unit 11, by means of which a suitable position of the tool segments 6A, 6B may be determined and may be set via the moving units 10. The tool segments 6A, 6B may thus be displaced in a controllable and/or regulatable/regulable manner independently of one another transversely to the travel direction F relative to the base frame 3 and the chassis 4.

In the illustrated inter-row cultivator 2, the base frame 3 includes two foldable extensions 3A, 3B. The extensions 3A, 3B may be folded into the transport position along the travel direction F via actuators not shown and with the aid of the swivel device 13, so that the tool segments 6A, 6B also extend into transport position along the travel direction F. The moving units 10 are provided between the extensions 3A, 3B. Each of the moving units 10 is designed as a parallelogram guide and includes an actuator designed as a synchronous cylinder 10A. The synchronous cylinders 10A or valves associated therewith are connected in a signal-conducting manner to the control and/or regulating unit 11 so that the position of the respective tool segment 6A, 6B may be individually adjusted.

Detection means configured as camera systems 12 are assigned to the control and/or regulating unit 11. By means of the camera systems 12, the plant rows P may be detected, so that the control and/or regulating unit 11 may continuously determine positions, in which the soil working tools 9 are guided between the plant rows P. Since the soil working tools 9 are arranged on the tool segments 6A, 6B via the hoeing assembly 7 and the height guide device 8, the control and/or regulating unit 11 is configured to guide the soil working tools 9 between the plant rows P in an improved manner, in particular by compensating for changing distances X.

To compensate for changing distances X, a hoeing assembly 7 arranged centrally behind the base frame 3 also has an adjustable cutting width. In the case of the inter-row cultivator 2 with large working width AB shown in FIG. 1, the hoeing assembly 7 arranged in front of the applied distance X in the travel direction F has an adjustable cutting width so that its mode of operation may be adapted to the changing distances X. The distance between the soil working tools 9 arranged on the hoeing assembly 7 may be regarded as the cutting width of a hoeing assembly 7. With the aid of the adjustable cutting width of the centrally arranged hoeing assembly 7, intermediate spaces of varying distances X between the plant rows P of adjacent working widths S of a seeder may thus be worked in an improved manner.

The control and/or regulating unit 11 is further adapted to remotely adjust the height guide devices 8 of the hoeing assemblies 7, wherein the control and/or regulating unit 11 includes storage means for GPS-based data so that the adjustment of the height guide devices 8 may be performed automatically on the basis of the GPS data.

The chassis 4 of the inter-row cultivator 2 includes a steering axle, wherein the control and/or regulating unit 11 is adapted to steer the chassis 4. The control and/or regulating unit 11 may include storage means that are arranged to store the GPS data of a sowing operation performed by a seeder in a retrievable manner. Usually, so-called tramlines are created during the placement of seed. No seed is placed in the tramlines, so that, at a later time, maintenance equipment such as the inter-row cultivator 2 may be moved along these tramlines across the field without destroying plant rows P. The control and/or regulating unit is configured to steer the chassis 4, in particular along the created tramlines, on the basis of the GPS data stored on the storage means.

The control and/or regulating unit 11 may further include sensors for detecting the speed of the wheel axle of the towing vehicle 1, the link angle of the towing vehicle 1 and/or of the chassis 4 of the inter-row cultivator 2 and/or the position, in particular the GPS signal, of the towing vehicle 2 or may be connected to such sensors of the towing vehicle 2 in a data-exchanging manner. As a result, the control and/or regulating unit is configured to steer the chassis 4 on the basis of the signals of the data of such sensors.

Figure 6:
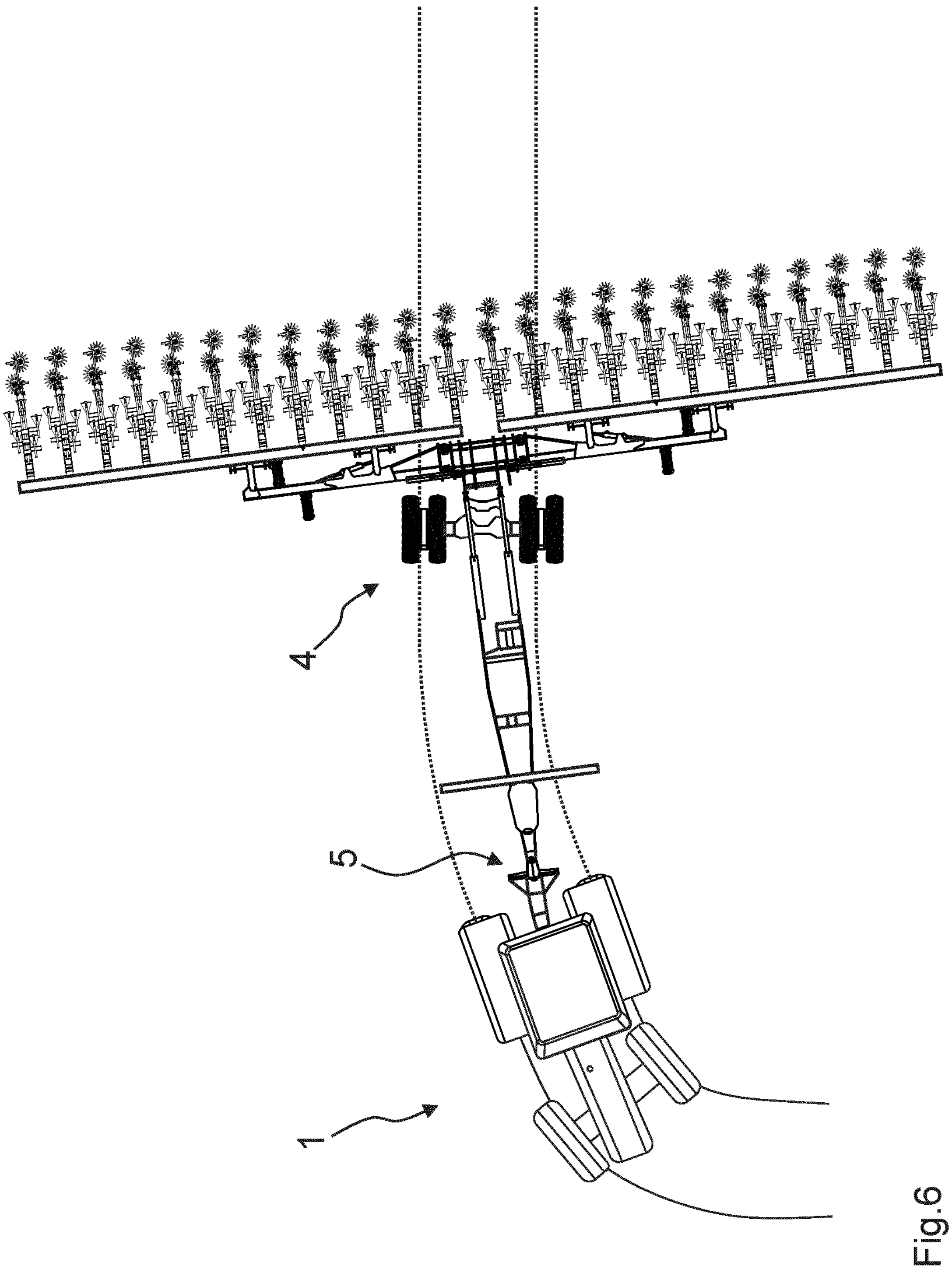
FIG. 6 shows a top view of the towing set in intermediate position when cornering.

By means of the steering axle, the chassis 4 may thus be swivelled relative to the base frame 3 so that it has a steering angle relative to the travel direction F. The inter-row cultivator 2 may thus be steered out of the track of the towing vehicle 1 and/or follow the track of the towing vehicle 1 even when cornering, as indicated in FIG. 6. Furthermore, the inter-row cultivator 2 is configured by means of the steering axle of the chassis 4 and its coupling with the control and/or regulating unit 11 to counteract the downhill force pushing the inter-row cultivator 2 downhill out of the track of the towing vehicle 1 when driving on a slope by turning the chassis against the downhill force.

The inter-row cultivator 2 further includes a plurality of support wheels 14 arranged on the base frame 3. Two support wheels 14 are arranged on each of the two extensions 3A, 3B so as to enable the tool segments 6A, 6B and the moving units 10 to be supported on the soil. The support wheels 14 may be steerable about an upright axis, the support wheels 14 being connected to the control and/or regulating unit 11 in a signal-conducting manner. By steering the support wheels 14, the track of the inter-row cultivator 2 may be influenced.

Figure 3:
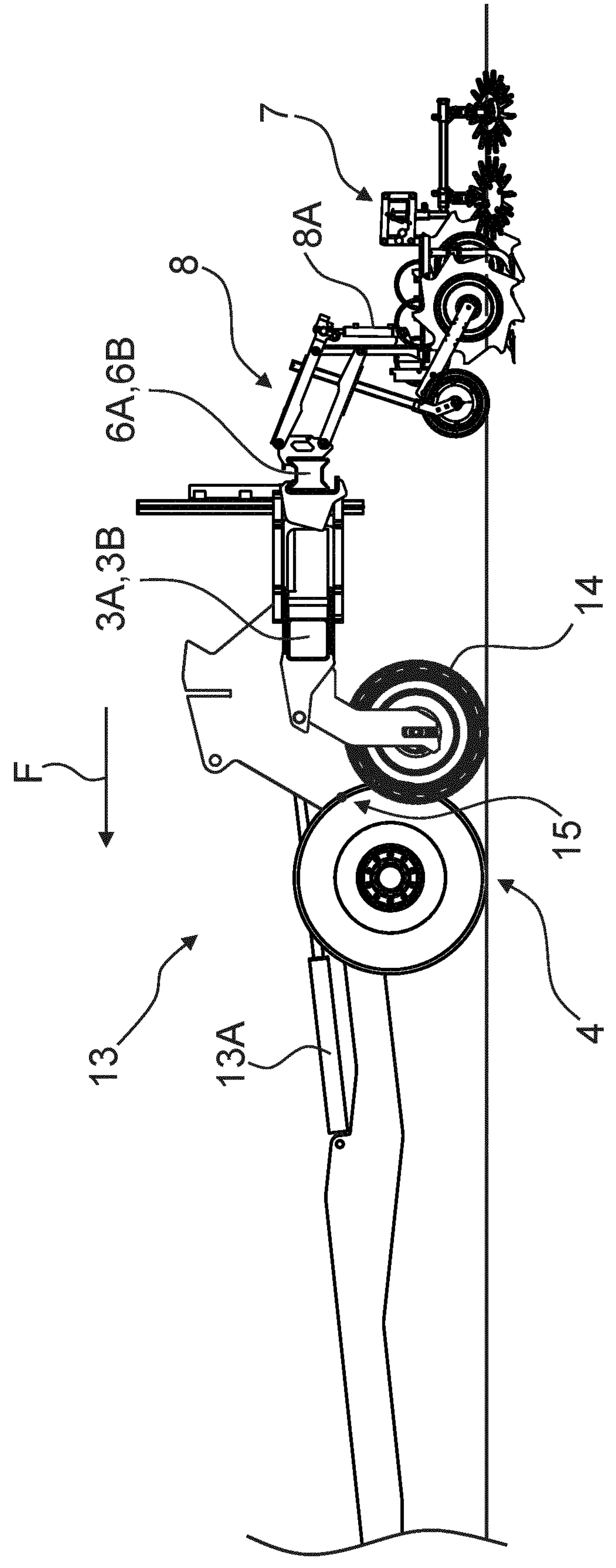
FIG. 3 shows a side view of the inter-row cultivator according to FIG. 1.
Figure 4:
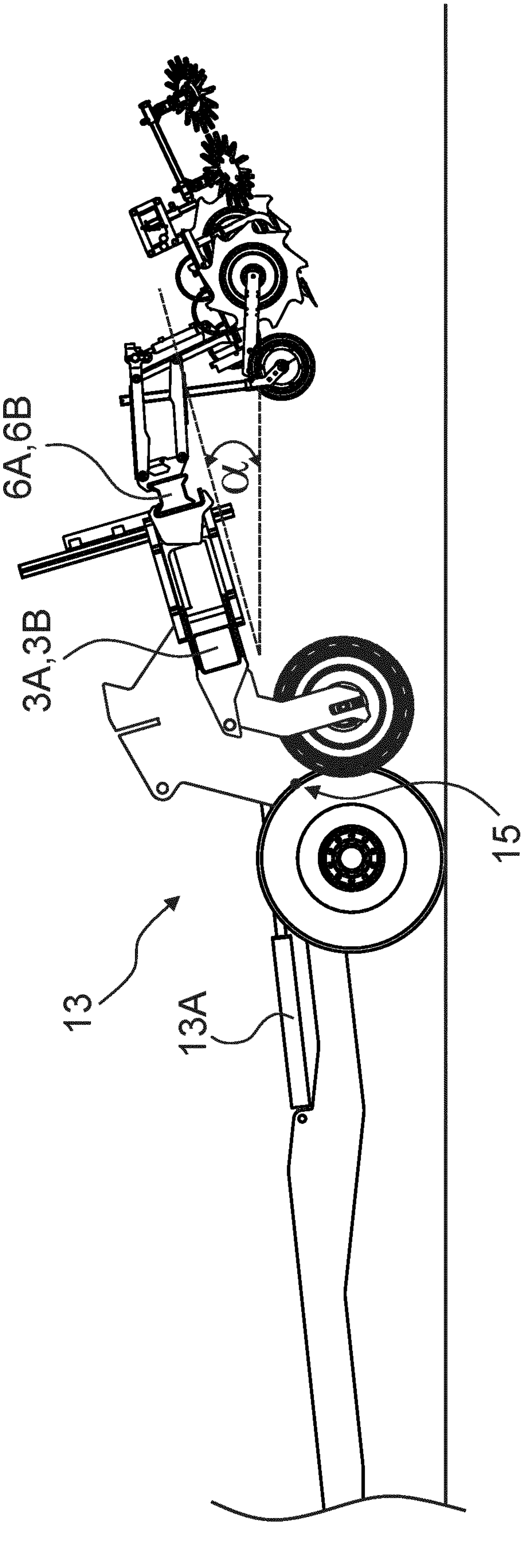
FIG. 4 shows a side view of the inter-row cultivator in a first intermediate position.

In an embodiment not shown, instead of at least one of the support wheels, a coulter disc is arranged on an extension 3A, 3B of the base frame 3 so as to be rotatable in an adjustable manner about an at least approximately upright axis. The control and/or regulating unit 11 is configured to adjust an angle of attack of the coulter disc. In the working position of the inter-row cultivator 2, the coulter disc is in contact with the soil comparable to the soil working tools 9, as shown in FIG. 3. Preferably, one coulter disc is arranged on each extension 3A, 3B. The coulter discs may thus transmit forces between the soil and the base frame 3. If the coulter discs are aligned in the travel direction F, their resistance due to contact with the soil transverse to the travel direction F acts against lateral forces emanating from the base frame 3, while no force is transmitted from the coulter discs to the base frame 3. The coulter discs may transmit a force to the base frame 3 by means of an angle of attack. For this purpose, the coulter discs may be rotated in an adjustable manner by the control and/or regulating unit 11 via an actuator.

The control and/or regulating unit 11 includes detection means for determining the relative position between the inter-row cultivator 2 and the towing vehicle 1. On the basis of these detection means the control and/or regulating unit 11 is configured to steer the chassis 4 in such a way that it follows the track of the towing vehicle 1. These detection means may include a gyroscope and/or an angle detector between the drawbar 5 and the towing vehicle 1.

Furthermore, the control and/or regulating unit 11 includes detection means for determining an inclination of the inter-row cultivator 2. By means of these detection means, the control and/or regulating unit 11 is configured to steer the chassis 4 and, if coulter discs are present, to set an adapted angle of attack of the coulter discs. By means of the detection means, the control unit 11 is configured to determine downward forces resulting from the detected inclination and to counteract them via the chassis 4 and/or the coulter disc. When driving on slopes, the occurring slope drift may thus be compensated for in an advantageous manner.

As explained above, the moving units 10 may also be used to displace the tool segments 6A, 6B in working position transverse to the travel direction F. However, when the moving units 10 are actuated lateral forces are generated by the soil working tools 9 in contact with the soil, which act on the base frame 3 and could push the chassis 4 off track. The control and/or regulating unit 11 therefore includes sensors for detecting the lateral forces, wherein the control and/or regulating unit 11 may steer the chassis 4 and/or set a suitable angle of attack of the coulter discs on the basis of the detected lateral forces. The suitable steering of the chassis 4 and/or a suitable angle of attack of the at least one coulter disc may thus at least approximately compensate the lateral forces, so that the inter-row cultivator 2 is guided in an improved manner.

In order to control the moving units 10 in an expedient and operationally safe manner, the control and/or regulating unit 11 includes detection means for detecting a displacement path of the moving units 10. The detection means may be designed as a displacement measuring system of the synchronous cylinders 10A. The control and/or regulating unit 11 may steer the chassis 4 and/or set an angle of attack of the coulter disc on the basis of the detected displacement path. Thus, the chassis 4 may be steered, for example, in the direction of the displacement path of a moving unit 10, so that the displacement path is available again for guiding the hoeing assemblies 7 between the plant rows P.

The control and/or regulating unit 11 also includes storage means that are configured to store the GPS data of a sowing operation of a seeder in a retrievable manner. The control and/or regulating unit 11 may use the GPS data of the sowing operation, in particular the position data of the deposited seed and/or created tramlines, to control the moving units 10 and the height guide devices 8, so that the hoeing assemblies 7 may be guided in a suitable manner between the plant rows P even if the camera system 12 fails.

The control and/or regulating unit 11 is further connectable to the towing vehicle 1 in a signal-conducting manner, so that control signals, such as steering signals and/or signals for controlling at least one hydraulic control unit, may be transmitted to the towing vehicle 1. The actuators of the inter-row cultivator 2 may thus be controlled directly by the towing vehicle by being coupled to a hydraulic control unit of the towing vehicle 1. Furthermore, the track guidance of the towing vehicle 1 including the towing vehicle and the inter-row cultivator 2 may be improved by providing the towing vehicle 1 with a track from the control and/or regulating unit 11. The towing vehicle 1 may then move to this track so that the inter-row cultivator 2 is moved in an improved manner over the field to be cultivated.

Towing vehicles 1 of this type regularly have a three-point linkage with two lower links at their rear end. The inter-row cultivator 2 is attached to the lower links of the towing vehicle 1 via its drawbar 5. In order to create a particularly robust control of the actuator for steering the steering axle of the chassis 4 and/or of the actuator for setting the angle of attack of the coulter disc for the towing vehicle, a hydraulic master cylinder may be arranged between the lower links and the inter-row cultivator 2. The master cylinder is thus configured to detect an angle between the inter-row cultivator 2 and the towing vehicle 1. The control is implemented in that the master cylinder is directly hydraulically coupled to at least one of the aforementioned actuators, so that oil displaced from the master cylinder leads to a change in travel of one of the or both actuators.

As can be seen from FIGS. 1 to 5, the base frame 3 includes the swivel device 13 already mentioned above. The swivel device 13 has the horizontal swivel axis 15, which is arranged transverse to the travel direction F. The moving units 10 and tool segments 6A, 6B arranged on the extensions 3A, 3B may be pivoted about the horizontal swivel axis 15. For this purpose, the swivel device 13 includes the actuators 13A. In order to move the moving units 10 and the tool segments 6A, 6B from the working position shown in FIG. 3 to an intermediate position shown in FIG. 4, the actuators 13A may be actuated. The tool segments 6A, 6B and the moving units 10 are swiveled upwards with respect to the horizontal by a swivel angle $\alpha$ of at least 10 degrees. Preferably, the swivel angle $\alpha$ may be at least 30 degrees or, particularly preferably, at least 50 degrees. The soil working tools 9 already have an increased ground clearance in this intermediate position, so that the inter-row cultivator 2 may be turned at the headland. For turning the inter-row cultivator 2 when reaching the end of a plant row P to be cultivated, the control and/or regulating unit 11 may actuate the swivel device 13 to establish the ground clearance. Upon reaching the beginning of a plant row P to be cultivated, the control and/or regulating unit 11 may actuate the swivel device 13 to return the tool segments 6A, 6B to the working position.

Figure 5:
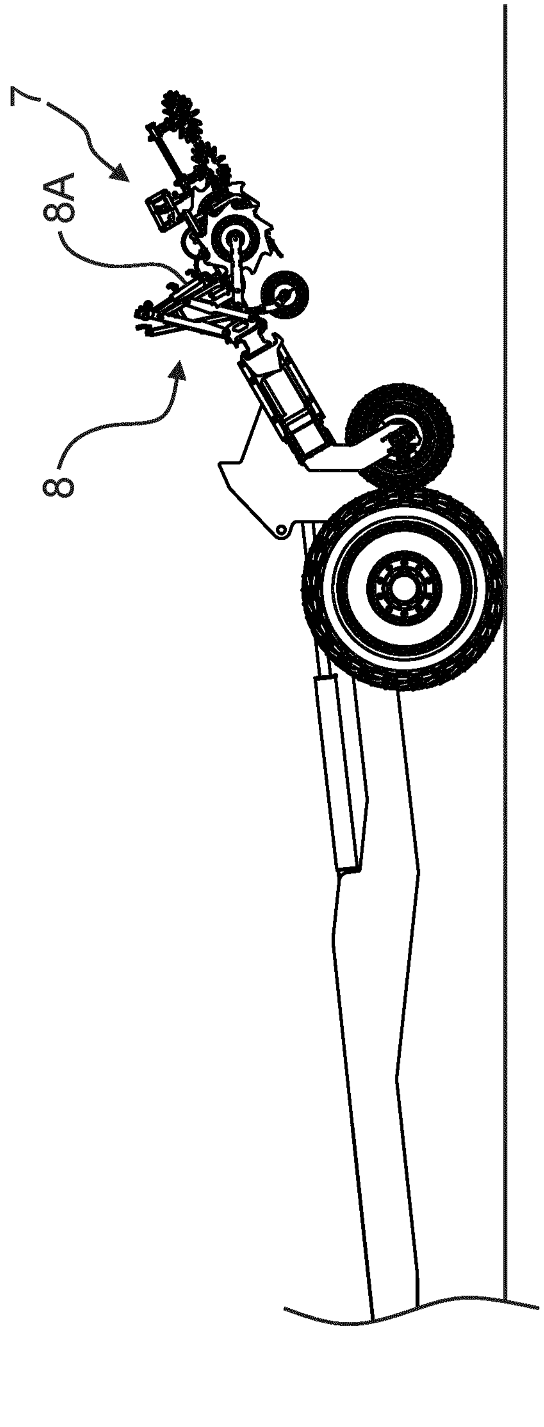
FIG. 5 illustrates a side view of the inter-row cultivator in a second intermediate position.

In addition, the hoeing assemblies 7 may be brought into a further raised position via the height guide devices 8, as shown in FIG. 5. By means of a suitable input device, which is arranged on the towing vehicle 1 for example, the control and/or regulating unit 11 may be preset by a user with a target value as a height value that corresponds to the height, to which the soil working tools 9 are to be raised with the aid of the swivel device 13 and/or the height guide devices 8 for the turning process. The user may thus adapt the lifting of the hoeing assemblies 7 during the turning operation to the size of the plant rows P to be cultivated and, as a result, make the turning operation efficient.

In order to move the inter-row cultivator 2 from the working position shown in FIG. 1 to the transport position shown in FIG. 2, the swivel device 13 is combined with a folding device for folding the extensions 3A, 3B. First, the extensions 3A, 3B in combination with the moving units 10 and tool segments 6A, 6B arranged thereon are swiveled up by at least approximately 90 degrees by means of the swivel device 13. The hoeing assemblies 7 thus point upwards from the tool segments 6A, 6B at least approximately vertically, as can be seen in FIG. 2. By means of the folding device, the extensions 3A, 3B together with the moving units 10 and tool segments 6A, 6B arranged thereon are then folded forward so that they extend in the travel direction F. In addition, the parallelogram guides of the moving units 10 are deformed by means of the synchronous cylinders 10A by the control and/or regulating unit 11 in such a way that the area 16 enclosed by the parallelogram guide is reduced. In other words, the tool segments 6A, 6B are shifted backwards in the travel direction by means of the moving units 10, thereby lowering the same and the hoeing assemblies 7 arranged thereon. The inter-row cultivator 2 thus reaches a transport position with a particularly low transport height and small transport width.

An electro-hydraulic sequential circuit may be provided that couples the swivel device 13 and the folding device for moving the tool segments 6A, 6B between the working position and the transport position so that the sequence of movements described above may run automatically.

In FIG. 6, the towing set consisting of towing vehicle 1 and inter-row cultivator 2 is shown during cornering, such as occurs during turning. While the towing vehicle 1 is already on a curved section of the track, the inter-row cultivator 2 extends far to the rear, where the chassis 4 is still on a straight section of the track. To ensure that the chassis 4 does not leave the track while the towing vehicle 1 is already pulling the drawbar 5 into the curve and thus begins to turn the inter-row cultivator 2, the control and/or regulating unit 11 is configured to steer the chassis 4. For this purpose, detection means and sensors explained above may be used in an advantageous manner to improve the steering maneuver. In order to further improve the cornering and the tracking of the inter-row cultivator 2, the drawbar is designed to be variable in length, namely telescopic. The control and/or regulating unit 11 is arranged to adjust the length of the drawbar. While a short drawbar length is advantageous in the working position, in particular for the turning operations, an increased drawbar length may be set for assuming the transport position so that the tool segments 6A, 6B have sufficient space along the inter-row cultivator 2.

In order to efficiently process the multitude of signals from various detection units and to convert them into control signals for all actuators, the control and/or regulating unit 11 may be configured as a central computer. The control and/or regulating unit 11 configured as a central computer includes an optimization program for coordinating the control of the actuators.

LIST OF REFERENCE SIGNS

1 Towing vehicle
2 Inter-row cultivator
3 Base frame
3A, 3B Extension
4 Chassis
5 Drawbar
6A, 6B Tool segment
F Travel direction
AB Working width
7 Hoeing assembly
8 Height guide device
8A Actuator
P Plant row
9 Soil working tool
S Working width (seeder)
X Distance
10 Moving unit
10A Synchronous cylinder
11 Control and/or regulating unit
12 Camera system
13 Swivel device
13A Actuator
14 Support wheel
15 Swivel axis
α Swivel angle
16 Area

The invention claimed is:

1. An inter-row cultivator with a large working width, comprising:

a base frame with a chassis that supports the base frame on the soil, and a drawbar which attaches the inter-row cultivator to a towing vehicle, at least two tool segments extending over substantially the entire working width in a working position transverse to a travel direction, a plurality of hoeing assemblies arranged on the tool segments via a respective height guide device, wherein soil working tools associated with individual plant rows are arranged on the hoeing assemblies, wherein the tool segments are arranged on the base frame in separately movable manner transversely to the travel direction via a respective moving unit so as to be controllable and/or regulatable at least in the working position, with a control and/or regulating unit being provided so as to determine suitable positions of the tool segments and to set said positions by means of the moving units, wherein the chassis comprises at least one steering axle, and the control and/or regulating unit is configured to steer the chassis, and wherein the control and/or regulating unit comprises detection means for determining an inclination of the inter-row cultivator, wherein the control and/or regulating unit is configured to steer the chassis and/or to set an adapted angle of attack of the coulter disc on the basis of the detected inclination.

2. The inter-row cultivator according to claim 1, characterized in that the control and/or regulating unit comprises detection means for determining the relative position between the inter-row cultivator and the towing vehicle, in that the control and/or regulating unit is configured to steer the chassis so as to follow the track of the towing vehicle.

3. The inter-row cultivator according to claim 1, characterized in that the control and/or regulating unit comprises sensors for detecting lateral forces arising from the actuation of the moving units, wherein the control and/or regulating unit is configured to steer the chassis and/or to set an adapted angle of attack of the coulter disc on the basis of the detected lateral forces.

4. The inter-row cultivator according to claim 1, characterized in that the control and/or regulating unit comprises detection means for detecting a displacement path of the moving units wherein the control and/or regulating unit is configured to steer the chassis and/or to set an adapted angle of attack of the coulter disc on the basis of at least one detected displacement path.

5. The inter-row cultivator according to claim 1, characterized in that the drawbar is configured to be variable in length, wherein the control and/or regulating unit is configured to adjust the length of the drawbar.

6. The inter-row cultivator according to claim 1, characterized in that the control and/or regulating unit is configured to be connected to a towing vehicle in a signal-conducting manner and to transmit control signals, in particular steering signals and/or signals for controlling at least one hydraulic control unit, to the towing vehicle.

7. The inter-row cultivator according to claim 1, characterized in that the base frame comprises at least one swivel device with at least one horizontal swivel axis, in that the moving units and/or tool segments are configured to be swiveled about the horizontal swivel axis by at least 10 degrees.

8. The inter-row cultivator according to claim 7, characterized in that the control and/or regulating unit is configured to actuate the swivel device for turning the inter-row cultivator, in particular when the end and/or beginning of a plant row to be cultivated is reached.

9. The inter-row cultivator according to claim 1, characterized in that the moving units comprise a parallelogram guide, wherein, for assuming the transport position, the control and/or regulating unit is configured to actuate the moving units so as to reduce the area enclosed by the parallelogram guide.

10. The inter-row cultivator according to claim 7, characterized by a sequential circuit, in particular an electro-hydraulic sequential circuit coupling the swivel device to a folding device for moving the tool segments between the working position and the transport position.

11. The inter-row cultivator according to claim 1, wherein at least one hoeing assembly has an adjustable cutting width.

12. The inter-row cultivator according to claim 1, characterized in that the control and/or regulating unit is implemented as a central computer configured to receive signals from detection units and to process them further for the optimized control of actuators.

13. The inter-row cultivator according to claim 1, characterized in that the control and/or regulating unit comprises storage means configured to store the GPS data of a sowing operation of a seeder in a retrievable manner, in that the control and/or regulating unit is configured to control the moving units on the basis of the GPS data of the sowing operation.

14. A towing set comprising a towing vehicle and an inter-row cultivator according to claim 1, wherein the towing vehicle comprises a three-point linkage with two lower links, characterized in that a hydraulic master cylinder is arranged between the lower links and the inter-row cultivator so as to enable detection of an angle between the inter-row cultivator and the towing vehicle, in that the master cylinder is coupled directly hydraulically to an actuator for steering the steering axle of the chassis and/or to an actuator for setting the angle of attack of the coulter disc.

15. The inter-row cultivator according to claim 1, wherein said at least two tool segments extend longitudinally to a travel direction in a transport position.

16. The inter-row cultivator according to claim 1, wherein said height guide device is remotely adjustable.

17. The inter-row cultivator according to claim 1, wherein the detection means determines an inclination of the at least two tool segments to steer the chassis and/or set the adapted angle of attack of the coulter disc.

18. An inter-row cultivator with a large working width, comprising:

a base frame with a chassis that supports the base frame on the soil, and a drawbar which attaches the inter-row cultivator to a towing vehicle, at least two tool segments extending over substantially the entire working width in a working position transverse to a travel direction, a plurality of hoeing assemblies arranged on the tool segments via a respective height guide device, wherein soil working tools associated with individual plant rows are arranged on the hoeing assemblies, wherein the tool segments are arranged on the base frame in separately movable manner transversely to the travel direction via a respective moving unit so as to be controllable and/or regulatable at least in the working position, with a control and/or regulating unit being provided so as to determine suitable positions of the tool segments and to set said positions by means of the moving units, wherein at least one coulter disc is arranged on the base frame, in particular on an extension of the base frame, so as to be rotatable in an adjustable manner about an at least approximately upright axis, wherein the control and/or regulating unit is configured to adjust an angle of attack of the coulter disc, and wherein the control and/or regulating unit comprises detection means for determining an inclination of the inter-row cultivator, wherein the control and/or regulating unit is configured to steer the chassis and/or to set an adapted angle of attack of the coulter disc on the basis of the detected inclination.

19. The inter-row cultivator according to claim 18, characterized in that the control and/or regulating unit comprises detection means for determining the relative position between the inter-row cultivator and the towing vehicle, in that the control and/or regulating unit is configured to steer the chassis so as to follow the track of the towing vehicle.

20. The inter-row cultivator according to claim 18, characterized in that the control and/or regulating unit comprises sensors for detecting lateral forces arising from the actuation of the moving units, wherein the control and/or regulating unit is configured to steer the chassis and/or to set an adapted angle of attack of the coulter disc on the basis of the detected lateral forces.

* * * * *